(12) United States Patent
Weber et al.

(10) Patent No.: US 6,648,003 B2
(45) Date of Patent: Nov. 18, 2003

(54) BACKFLOW PREVENTER

(75) Inventors: Bruce Weber, Fenton, MO (US); Paul E. Naslund, St. Louis, MO (US)

(73) Assignee: Dema Engineering Company, St. Louis, MO (US)

( * ) Notice: Subject to any disclaimer, the term of this patent is extended or adjusted under 35 U.S.C. 154(b) by 0 days.

(21) Appl. No.: 09/921,399

(22) Filed: Aug. 2, 2001

(65) Prior Publication Data

US 2003/0024569 A1 Feb. 6, 2003

(51) Int. Cl.⁷ .................................................. E03C 1/10
(52) U.S. Cl. ....................................... 137/218; 137/888
(58) Field of Search ................................. 137/218, 888

(56) References Cited

U.S. PATENT DOCUMENTS

| | | | | |
|---|---|---|---|---|
| 2,033,467 A | * | 3/1936 | Groeniger | 137/218 |
| 2,646,063 A | * | 7/1953 | Hayes | 137/218 |
| 3,011,512 A | * | 12/1961 | Moen | 137/218 |
| 3,171,423 A | | 3/1965 | Dillon | 137/218 |
| 3,207,171 A | * | 9/1965 | Kryman | 137/218 |
| 3,346,001 A | * | 10/1967 | Camp | 137/218 |
| 3,952,770 A | * | 4/1976 | Botnick | 137/218 |
| 4,080,981 A | * | 3/1978 | Stewart | 137/218 |
| 4,712,575 A | * | 12/1987 | Lair et al. | 137/218 |
| 4,726,390 A | * | 2/1988 | Franklin | 137/218 |
| 4,893,644 A | * | 1/1990 | Giacomini | 137/218 |
| 4,984,306 A | * | 1/1991 | Sumerix | 137/218 |
| 5,253,677 A | | 10/1993 | Sand | 137/888 |
| 5,797,420 A | | 8/1998 | Nowicki et al. | 137/216 |
| 6,363,977 B1 | | 4/2002 | Smeller et al. | |
| 2002/0040737 A1 | * | 4/2002 | Beldham et al. | 141/18 |

\* cited by examiner

*Primary Examiner*—Gerald A. Michalsky
(74) *Attorney, Agent, or Firm*—Polster, Lieder, Woodruff & Lucchesi, L.C.

(57) ABSTRACT

This backflow preventer includes a body having an upper portion providing an inlet and a lower portion providing an outlet. The body includes a backflow preventer having a nozzle communicating with the inlet, a passage communicating with the outlet and a diaphragm disposed between the nozzle and the passage. The diaphragm is maintained in the closed position by a resilient element and is movable under inlet water pressure from a closed position to an open position. The diaphragm is moved into the closed position by reverse back-up flow assisted by the resilient element and a relief gap is provided below the diaphragm to permit escape of reverse backflow.

1 Claim, 4 Drawing Sheets

BACKFLOW PREVENTER

BACKGROUND OF THE INVENTION

This invention relates generally to a backflow preventer which may be used in conjunction with a dispensing device such as a proportioner that mixes liquid detergent with water to provide a diluent mix.

Backflow prevention devices are used to prevent return of contaminated liquid mixes from dispensing devices, such as proportioners, back into a clean water supply.

A backflow preventer of the type under consideration is disclosed in U.S. Pat. No. 3,171,423. This patent discloses a combination diaphragm and check valve disc. These two components are both required to cooperate to provide backflow prevention. The check valve disc tends to impede flow into the outlet of the backflow preventer rather than allow a smooth flow into the outlet during normal operation.

Fluid mixing devices, sometimes know as proportioners typically make use of the venturi principle for inducing the liquid detergent into the water stream and backflow is prevented by providing an anti-syphoning air gap upstream of the venturi. This arrangement may function effectively in preventing backflow but may result in the discharge and overspill of the water through the air gap between the venturi nozzle and the inlet nozzle, which drips down the side of the proportioner.

U.S. Pat. No. 5,253,677 is an example of an air gap system which provides barriers adjacent to the windows which provide the air gap to prevent overspill. Unfortunately, the barriers block a clear view through the air gap which is required by some government authorities. Finally, U.S. Pat. No. 5,797,420, also owned by the assignee of the present invention, provides a unique structure for the venturi nozzle to avoid overspill while permitting a clear view through the air gap. This proportioner works well for its intended purpose to avoid overspill and provide backflow prevention but requires a special venturi arrangement.

The present backflow preventer solves these and other problems in a manner not disclosed in the known prior art.

SUMMARY OF THE INVENTION

This backflow preventer avoids the problem of backflow contaminating liquid detergent into the water supply, yet substantially precludes the escape of the liquid to atmosphere during normal operation and further permits smooth liquid flow to the outlet of the backflow preventer.

This backflow preventer comprises an upper body portion having an inlet and a lower body portion having an outlet. Means for preventing backflow is disposed in the body including a nozzle communicating with the inlet, a passage communicating with the outlet and a diaphragm disposed between the nozzle and the passage to control flow into the passage. The diaphragm is movable under water flow from a closed position blocking flow into the passage to an open position permitting flow into the passage; and is closed by reverse back-up flow.

It is an aspect of this invention to provide that the backflow preventer means includes resilient means for moving the diaphragm into the closed position.

It is another aspect of this invention to provide that the nozzle includes a depending hub portion; and the diaphragm includes a sleeve portion overfitting the hub portion in the closed position.

Yet another aspect of this invention is to provide that the nozzle includes an outer ring portion an inner hub portion and an intermediate perforated web; and the diaphragm includes an outer ring portion between the body and the nozzle and an imperforate web.

Still another aspect of this invention is to provide that the passage is formed by a tubular stem having an upper end spaced from the diaphragm sleeve in the closed position and an upper passage portion receiving the sleeve in sealed relation in the open position.

It is an aspect of this invention to provide that the tubular stem includes outer support means and the sleeve includes engagable means; and spring means is disposed between the support means and the engagable means tending to move the diaphragm into the closed position.

It is another aspect of this invention to provide that the body includes a side passage extending through the body.

It is still another aspect of this invention to provide that the body includes opposed side passages communicating with ambience.

It is an aspect of this invention to provide that the diaphragm sleeve includes a lower end spaced from the upper end of the tubular stem when the sleeve is in the closed position to provide an exit for reverse flow.

It is yet another aspect of this invention to provide that the tubular stem includes an outer support means and the diaphragm includes a recess between the sleeve and web; and the backflow preventer means includes a spring having a lower portion operatively seating on the tubular outer support means and an upper portion received by the diaphragm recess and exerting a force on the diaphragm tending to move the diaphragm into the closed position.

It is an aspect of this invention to provide that the spring includes an annular retainer receiving the spring upper end and being engagable with the diaphragm.

It is another aspect of this invention to provide that the body upper portion includes an inner support portion and an inclined support portion below the inner support portion; and the diaphragm includes an outer portion supported by the inner support portion and an intermediate web which is permitted to move downwardly by the inclined support portion when the diaphragm is moved into the open position.

Another aspect of this invention is to provide that the passage is formed by a tubular stem having an upper end spaced from the nozzle and an upper passage portion receiving the sleeve portion of the diaphragm when the diaphragm moves to the open position, the stem upper end being configured to facilitate receiving said sleeve portion.

It is an aspect of this invention to provide that the gap assembly includes O-ring receivable in the inlet of the body to retain the nozzle and the diaphragm in place.

This invention provides a backflow preventer which utilizes a simple and inexpensive arrangement of parts and is very efficient for its intended purpose.

DESCRIPTION OF THE PREFERRED EMBODIMENT

Figures 1, 2:
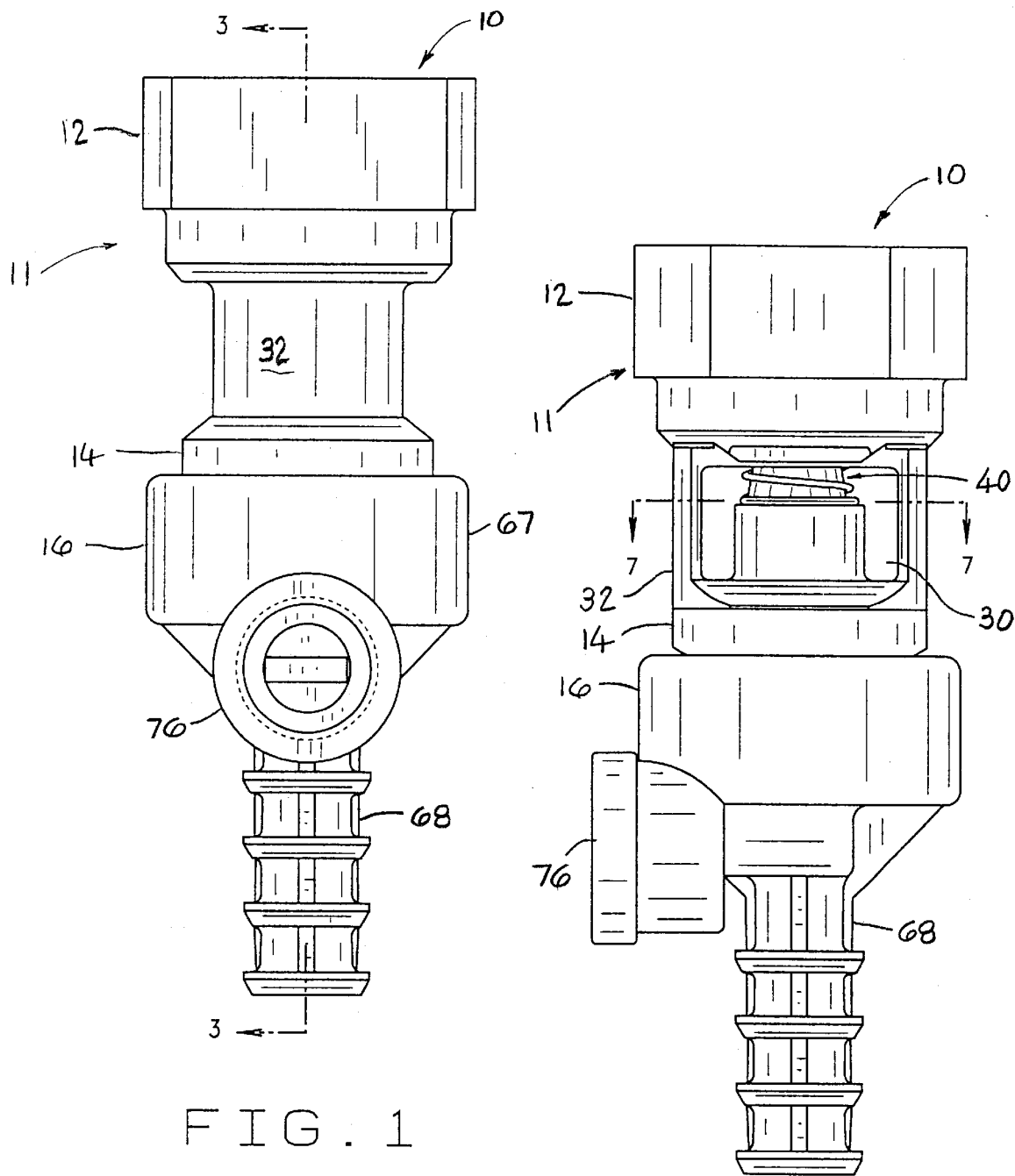
FIG. 1 is a front elevational view of the backflow preventer used in conjunction with a proportioner.
FIG. 2 is a side elevational view thereof.
Figures 3, 4:
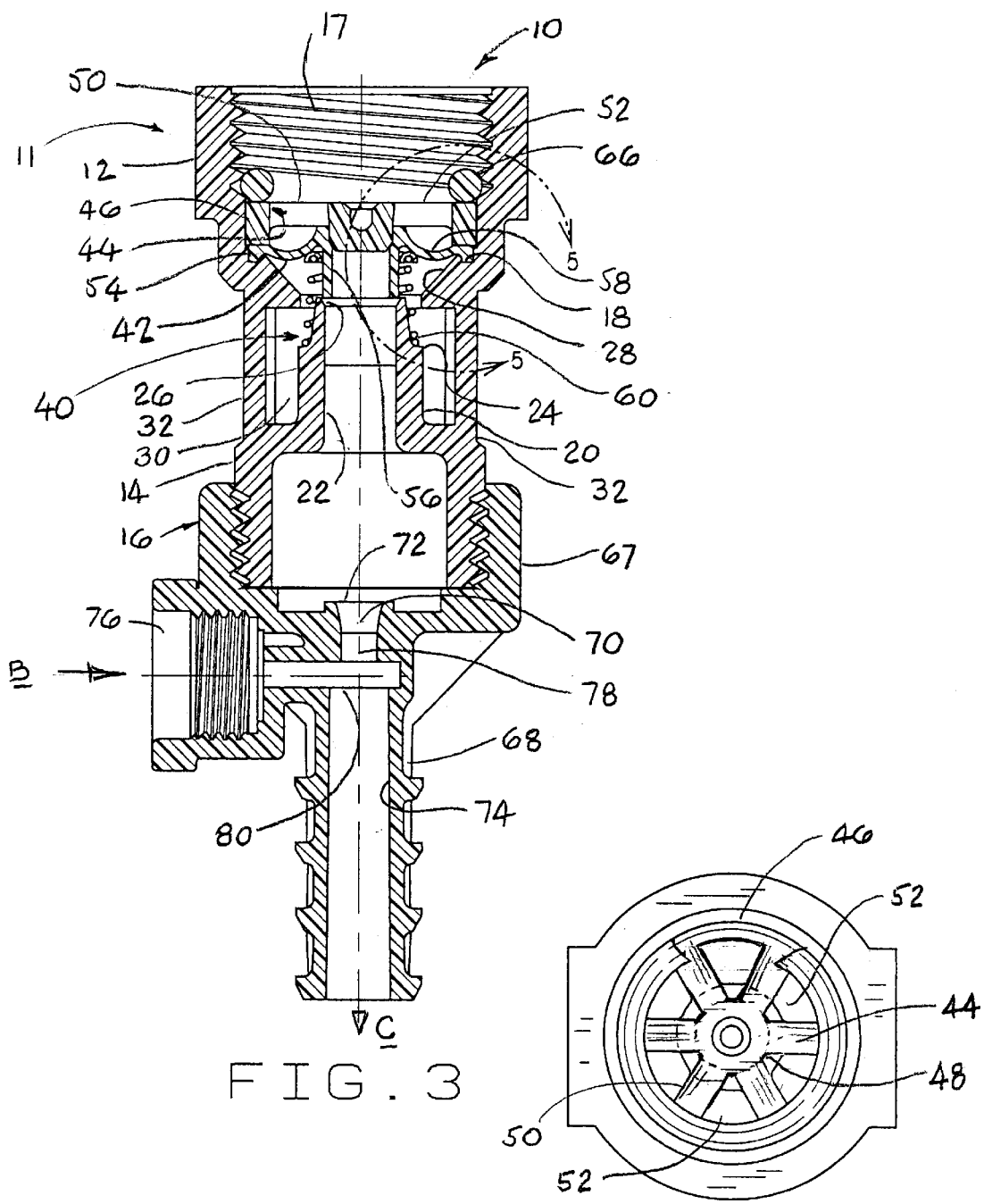
FIG. 3 is a longitudinal sectional view taken on Line 3—3 of FIG. 1.
FIG. 4 is a plan view thereof.

Referring now by reference numerals to the drawings and first to FIGS. 1–3, it will be understood that the backflow preventer 10 includes a body 11 having an upper body portion 12 and a lower body portion 14. The upper body portion 12 provides an inlet and is threadedly attached at its upper end to a water supply connection such as a faucet (not shown) and, the lower body lower portion 14 provides an outlet and may be threadedly attached to the inlet of mixing device such as a proportioner generally shown by numeral 16. However, the backflow preventer is not limited to use with a proportioner mixing device.

Figure 7:
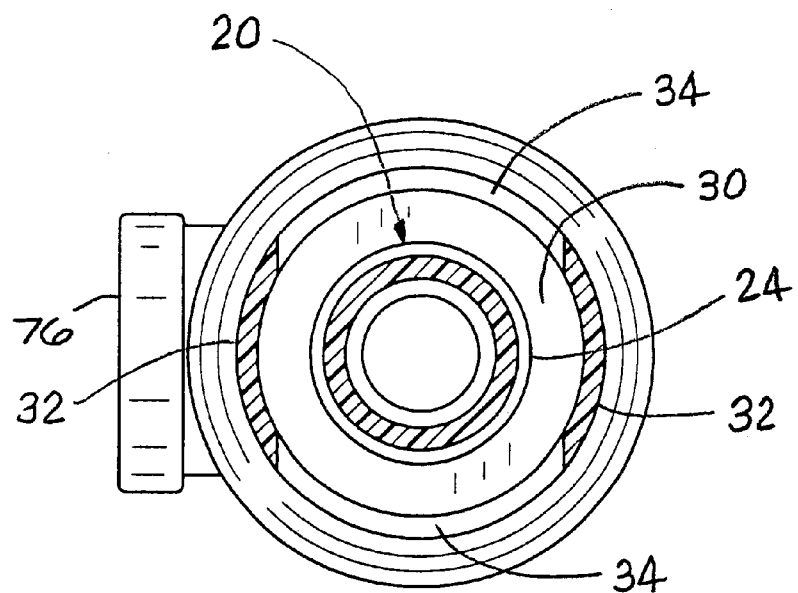
FIG. 7 is a cross-sectional view taken on line 7—7 of FIG. 2.
Figure 8:
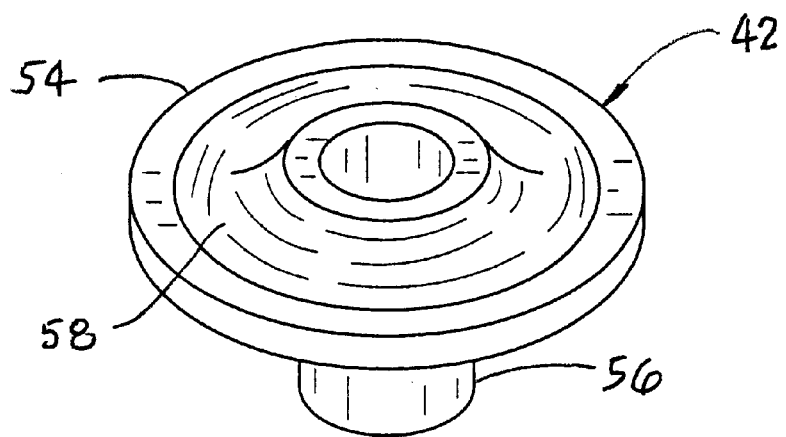
FIG. 8 is a perspective view of the diaphragm.

As best shown in FIG. 3, the body 11 is adapted to house an assembly 40 which constitutes a backflow preventer means and includes an inlet 17 and a circular seat 18 providing support for a diaphragm 42 and an inlet nozzle 44. The body 11 includes a tubular stem 20 defining a passage 22, the stem having an outer circular support seat 24 and a chamfered upper end 26. The body 11 also includes a transverse air gap passage 30 defining arcuate side wall portions 32 and opposed windows 34 (FIG. 7) communicating with atmosphere. Below the seat 18 is an annular inclined portion 28 providing a space and support for the diaphragm 42, as will be described later.

The backflow preventer assembly nozzle 44 includes an outer ring 46, a center hub 48 and an intermediate recessed web 50 having a plurality of nozzle openings 52. The diaphragm 42 includes an outer ring 54, which interfits the seat 18, a sleeve 56 and an intermediate imperforate web 58. In the closed position shown in FIG. 3 and FIG. 5, the diaphragm 42 abuts the nozzle web 50 and is urged upwardly by a spring 60, constituting a resilient means, which seats on the circular support seat 24 at its lower end and is provided at its upper end with a cup-shaped retainer ring 62. The retainer ring 62 is urged by the spring 60 into a circular recess 64, which is provided between the diaphragm sleeve 56 and the intermediate web 58, and protects the diaphragm 42 against gouging by the spring 60. The sleeve 56 has an end 57 which is spaced from the chamfered end 26 of the tubular stem 20.

Figure 5:
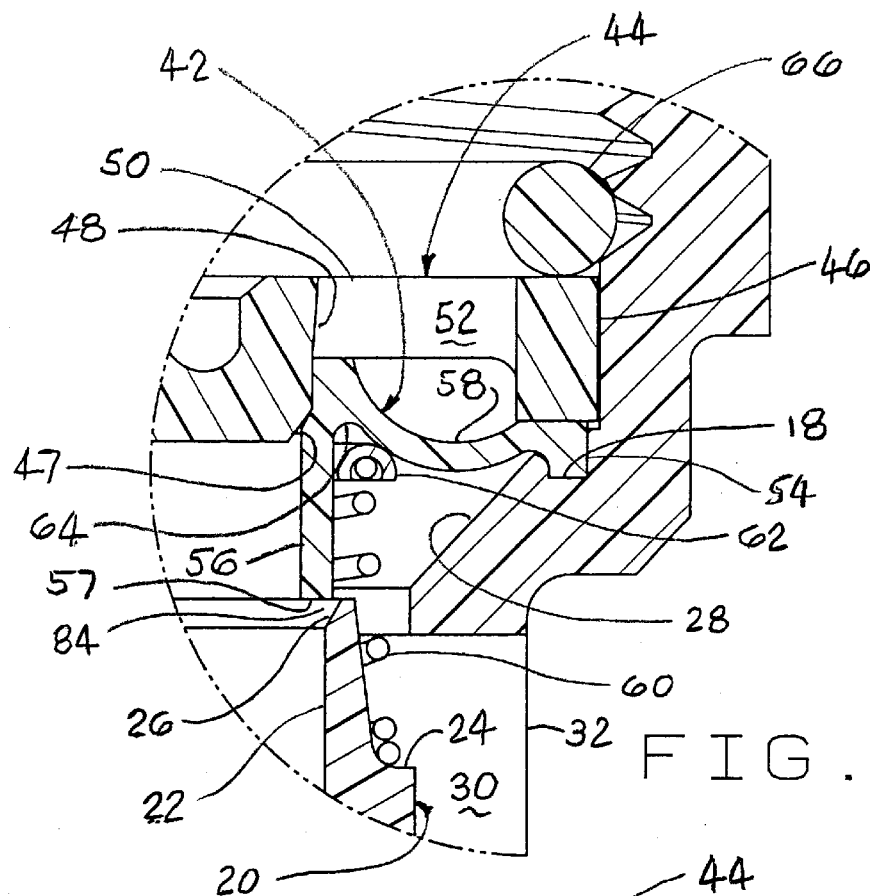
FIG. 5 is an enlarged fragmentary view of the backflow preventer shown in FIG. 3 with the diaphragm in the closed position.

In the closed position, as shown in FIG. 5, there is a relatively narrow gap 84 between the lower end 57 the diaphragm sleeve 56 and the upper end of the tubular stem 20, which provides a relief exit into the side passages 30 and the windows 34 (FIG. 7), in the event of backflow, and relieves pressure on the underside of the diaphragm 42.

Figure 6:
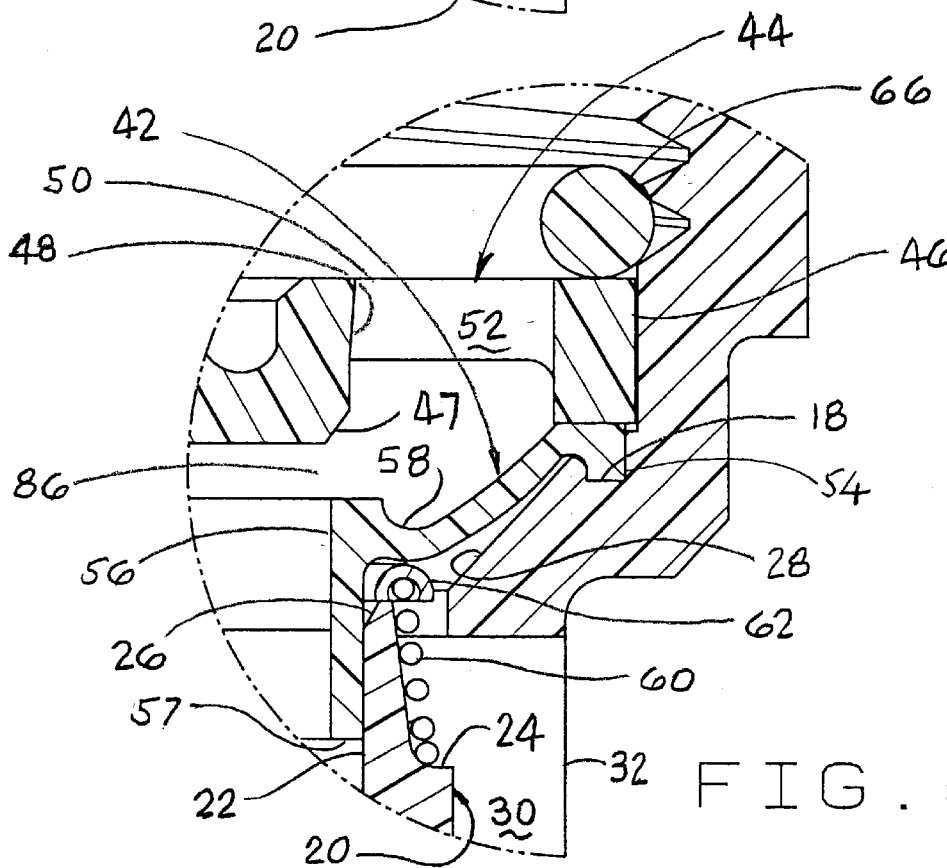
FIG. 6 is a similar view to FIG. 5 with the diaphragm in the open position.

In the open position, as best shown in FIG. 6, water under pressure entering the nozzle openings 52 pushes against the diaphragm web 58 so that the sleeve 56 is received by the passage 22 leaving a relatively wide gap 86 providing smooth entry of water into the sleeve 56 and the passage 22.

The diaphragm 42 and the nozzle 44, in the embodiment shown, may be held in place by O-ring 66 which has an O.D. slightly greater than the I.D. of the engaged threads so that it is held firmly in place.

The mixing device 16, in the embodiment shown by way of example, includes a threaded upper end 67 adapted to receive the threaded lower end 14 of the backflow preventer 10 and further includes an outlet spout 68 at the lower end. The mixing device 16 houses a venturi system generally indicated by numeral 70. In the embodiment shown, by way of example, the venturi system 70 includes a venturi nozzle 72 leading into a lower passage 74, defined by the outlet spout 68, and an induction port 76 which is adapted to receive detergent front a hose (not shown). The induction port 76, is connected to a venturi throat 78 at the upper end of the passage 74 by a lateral passage 80 which serves to inject liquid detergent into the venturi throat 78 below the venturi nozzle 72. The venturi nozzle 72 is rounded at its upper end to facilitate delivery of water from the venturi system 70 to exit through the outlet spout 68 into a hose (not shown) which is attached to said spout.

It is thought that the structural features and functional advantages of this backflow preventer 10 have become fully apparent from the foregoing description of parts. However, for completeness of disclosure the operation of the device, with reference to FIG. 3 and enlarged FIGS. 5 and 6 will be briefly described.

Initially, the configuration of the diaphragm is as shown in FIG. 5 and the diaphragm 42 is held in the closed position by the spring 60. When water stream A under pressure from the faucet water supply, enters the backflow preventer inlet 17 and passes through the nozzle openings 52 it comes into contact with the imperforate diaphragm web 58, which is biased closed by the spring 60. The impact of the water supply pressure on the diaphragm web 58 pushes the diaphragm sleeve 56 downwardly into the tubular stem passage 22 against the resistance of the spring 60 and into the diaphragm configuration shown in FIG. 6. This movement of the diaphragm 42 permits water to enter the passage 22. The constant pressure of the water stream A, which is greater than the resistance of the spring 60, maintains the diaphragm 42 in the open, sealed position and water passes into the mixing device 16 and passes out of the spout outlet 65 to a downstream delivery area, until such time as the water supply is cut off. When cut-off occurs, the pressure of the spring 60 returns the diaphragm to the closed position. This water on/water off action can be repeated for thousands of cycles and the diaphragm arrangement is very reliable, in part because of the sealing arrangement resulting from the sleeve being guided downwardly by the hub 48 and into passage 22 by virtue of the axial alignment of said hub and the compatible shape of the hub and passage.

The provision of a hub having an external diameter slightly greater than the internal diameter of the sleeve results in a watertight seal when the water flow is cut off and the chamfer 47 of said hub facilitates the return of the sleeve 56 into the closed position. In the event that backflow occurs, the reverse upward pressure of the liquid pushes the diaphragm upwardly into the closed position which allows the liquid to escape through the relief area provided by the annular space between the lower end of the sleeve 56 and the top of the tubular stem 20, and indicated by numeral 84, so that the back pressure of the liquid is relieved and the mix is permitted to exit through the windows 34 provided by the side passages 30. The provision of the O-ring in the inlet prevents the nozzle 44 and the diaphragm 42 from moving upwardly out of position in the inlet 17.

In the preferred embodiment, the backflow preventer 10 and the nozzle 44 may be made from plastic material such as polypropylene; the diaphragm 42 and the O-ring 66 may be made from a resilient material such as ethylene propylene. The spring 60 and the retainer ring may be made front stainless steel. Other materials may be used as will be well-known to those skilled in the art.

In addition to being attached to the end of a faucet for direct water/detergent cleaning operations, the backflow preventer 10 can be used in conjunction with dispensing apparatus or the like provided with a valve (not shown) attached to the inlet end 17 of the backflow preventer. In particular, the backflow preventer can be used in conjunction with various venturi systems adapted to be attached to it depending on the desired flow. Thus, there is an advantage in making a backflow preventer 10 which is threadedly attachable to various venturi systems and other dispenser components for this reason.

Accordingly, although the backflow preventer has been described by making detailed reference to a preferred embodiment, the details of description are not to be understood as restrictive, numerous variants being possible within the scope of the claims hereunto appended.

We claim as our invention:

1. A backflow preventer comprising:

a body including an upper portion having an inlet and a lower portion having an outlet;

means disposed in the body for preventing backflow, said means including a nozzle communicating with the inlet, a passage communicating with the outlet and a diaphragm disposed between the nozzle and the passage to control flow into the passage; the diaphragm being movable under water flow from a closed position blocking flow into the passage to an open position permitting flow into the passage; the nozzle having a depending hub and the diaphragm including a generally cylindrical sleeve fitting over the hub in sealed relation in the closed position and fitting inside the passage in sealed relation in the open position, the diaphragm including an outer ring and an annular web disposed between the outer ring and the hub, the web having a substantially uninterrupted concave surface between the hub and the outer ring; and the hub having an outside diameter greater than the inside diameter of the sleeve to effectively seal the sleeve in the closed position.

* * * * *